United States Patent [19]

Kawano

[11] Patent Number: 5,652,921
[45] Date of Patent: Jul. 29, 1997

[54] SYSTEM FOR CONTROLLING AN APERTURE OF A LENS

[75] Inventor: Kiyoshi Kawano, Tokyo, Japan

[73] Assignee: Asahi Kogaku Kogyo Kabushiki Kaisha, Tokyo, Japan

[21] Appl. No.: 337,399

[22] Filed: Nov. 8, 1994

[30]     Foreign Application Priority Data

Nov. 8, 1993    [JP]    Japan .................................. 5-302418

[51] Int. Cl.$^6$ ................................................ G03B 17/00
[52] U.S. Cl. ........................................... 396/71; 396/132
[58] Field of Search ........................... 354/286, 271.1, 354/400; 396/71, 132

[56]              References Cited

U.S. PATENT DOCUMENTS

| | | | |
|---|---|---|---|
| 3,641,892 | 2/1972 | Strehle | 95/10 C |
| 3,667,365 | 6/1972 | Fujimoto et al. | 95/44 R |
| 3,747,485 | 7/1973 | Suzuki | 95/10 CT |
| 3,838,437 | 9/1974 | Hamm | 354/270 |
| 4,200,385 | 4/1980 | Shono | 354/233 |
| 4,295,715 | 10/1981 | Breen | 354/25 |
| 4,344,688 | 8/1982 | Metabi | 354/272 |
| 4,346,972 | 8/1982 | Takahashi | 354/195 |
| 4,455,723 | 6/1984 | Umetsu | 24/647 |
| 4,540,262 | 9/1985 | Nakai | 354/195.13 |
| 4,758,854 | 7/1988 | Saegusa | 354/286 |
| 4,857,951 | 8/1989 | Nakajima et al. | 354/400 |
| 4,924,249 | 5/1990 | Aihara et al. | 354/286 |
| 5,030,982 | 7/1991 | Takebayashi | 354/400 |
| 5,113,210 | 5/1992 | Kashiyama et al. | 354/400 |
| 5,192,965 | 3/1993 | Suzuki et al. | 354/400 |
| 5,313,244 | 5/1994 | Arai | 354/400 |
| 5,382,994 | 1/1995 | Naito et al. | 354/286 |
| 5,384,614 | 1/1995 | Hasuda | 354/286 |
| 5,505,535 | 4/1996 | Kawasaki et al. | 354/400 |

FOREIGN PATENT DOCUMENTS 7-234432    9/1995    Japan ............................. G03B 7/20

OTHER PUBLICATIONS

"Pentax Adapter K for 645 Lens", printed May 1984.

*Primary Examiner*—Safet Metjahic
*Assistant Examiner*—Christopher E. Mahoney
*Attorney, Agent, or Firm*—Greenblum & Bernstein P.L.C.

[57]              ABSTRACT

A system for controlling an aperture of a lens including an adapter for mounting the lens onto a camera body. The adapter includes a ring having an internal gear, and an aperture control bar formed on the ring. Another gear is provided which meshes with the internal gear. The aperture control bar contacts an aperture control lever of the lens, while the other gear is driven by a motor driven AF coupler of the camera body to rotate the ring. The rotation of the ring rotates the aperture control bar, which moves the aperture control lever of the lens. The size of the aperture of the lens is changed when the aperture control bar is moved.

15 Claims, 7 Drawing Sheets

SYSTEM FOR CONTROLLING AN APERTURE OF A LENS

BACKGROUND OF THE INVENTION

The present invention relates to a system for controlling an aperture of a lens attached to a camera. More specifically, the present invention is related to the control of an aperture of a lens which is attached to a camera through an adapter ring.

Generally, when a conventional single lens reflex (SLR) camera has a detachable lens mounted thereon, an aperture control mechanism of the camera is coupled to an aperture control lever of the lens. A spring force is applied to the aperture control lever of the lens, such that when the lens is detached from the camera, the aperture of the lens is either a maximum or minimum size, depending on where the spring force is applied.

Recently lens adapters have been provided such that lenses designed for cameras having a particular size of lens mount can be mounted on cameras having a different size of lens mount. For example, lenses designed to be used with cameras using Brownie film having an exposure frame size greater than a standard 35 mm camera (e.g., exposure frame size of 4.5 cm by 6 cm), can be attached to a lens adapter and then mounted on the standard 35 mm camera.

As mentioned above, the lens aperture control lever can be biased such that the aperture is normally at its maximum or minimum size. If a camera body that is designed to be used with a lens having its lens aperture control lever biased such that the aperture size is normally a maximum, is used with a lens having its lens aperture control lever biased such that its aperture size is normally a minimum, proper control of the aperture size cannot be achieved. Therefore, an auto exposure operation cannot be accomplished. This reduces the range of lenses that may be used with the camera body.

SUMMARY OF THE INVENTION

It is therefore an object of the present invention, to provide a system for controlling a size of an aperture of a lens that is attached to a camera body using an adapter. It is a further object of the present invention to provide a system for controlling a size of an aperture of a lens attached to a camera body using an adapter, even if the lens aperture control lever is biased in a manner that is different from that of a lens that is designed to be used with the camera body.

According to one aspect of the present invention, there is provided a system for controlling an aperture of a lens which includes an adapter for mounting the lens onto a camera body.

The adapter includes a ring having an internal gear and an aperture control bar formed thereon; and an other gear which meshes with the internal gear.

Thus the aperture control bar contacts an aperture control lever of the lens, and the other gear is driven by a motor driven AF coupler of the camera body to rotate the ring, the rotation of the ring rotates the aperture control bar, thereby moving the aperture control lever of the lens.

Thus, an aperture size of the lens is changed when the aperture control bar is moved.

According to another aspect of the present invention, there is provided a system for controlling an aperture of a lens, the lens being attached to a lens adapter, and the lens adapter being attached to a camera body. The lens includes a lens aperture control mechanism, for varying a size of a lens aperture.

The adapter includes a lens mounting mechanism for mounting the lens to the adapter, a camera body attaching mechanism for mounting the adapter to the camera body, a ring having an internal gear and an aperture control bar formed thereon, and another gear which meshes with the internal gear.

The camera body includes a motor-driven coupler; and a controller for controlling the drive amount of the motor-driven coupler.

Thus when the lens is mounted on the adapter and the adapter is mounted onto the camera body, the motor-driven coupler is coupled to the another gear, and the aperture control bar contacts the aperture control lever.

When an exposure is to be made, the controller controls the motor driven coupler to be driven by a determined amount, thereby rotating the another gear which rotates the ring, whereby rotation of the ring causes the aperture control bar to be moved, thereby moving the aperture control lever.

According to a further aspect of the present invention, there is provided a system for controlling an aperture of a lens which includes an adapter for mounting the lens onto a camera body. The camera includes a mechanism for driving an autofocus lens mechanism, and the lens includes an aperture size control mechanism. The adapter includes a coupling mechanism, wherein the coupling mechanism transmits a motive force of the autofocus lens mechanism driving mechanism to the aperture size control mechanism.

According to a further aspect of the present invention, there is provided a camera body to which at least a first and a second accessory can be selectively attached, each of the first and second accessory having operable members that can be driven. The camera body includes a motor;

a transmission mechanism for transmitting a driving force of the motor to one of the operable members of one of the first and second accessories attached to the camera body;

a detector for detecting whether the first accessory is attached to the camera body; and a controller for driving the motor. The controller drives the motor in a first mode when the first accessory is attached to the camera body, and the controller drives the motor in a second mode which is different from the first mode, when the second accessory is attached to the camera body.

DESCRIPTION OF THE EMBODIMENTS

Figure 1:
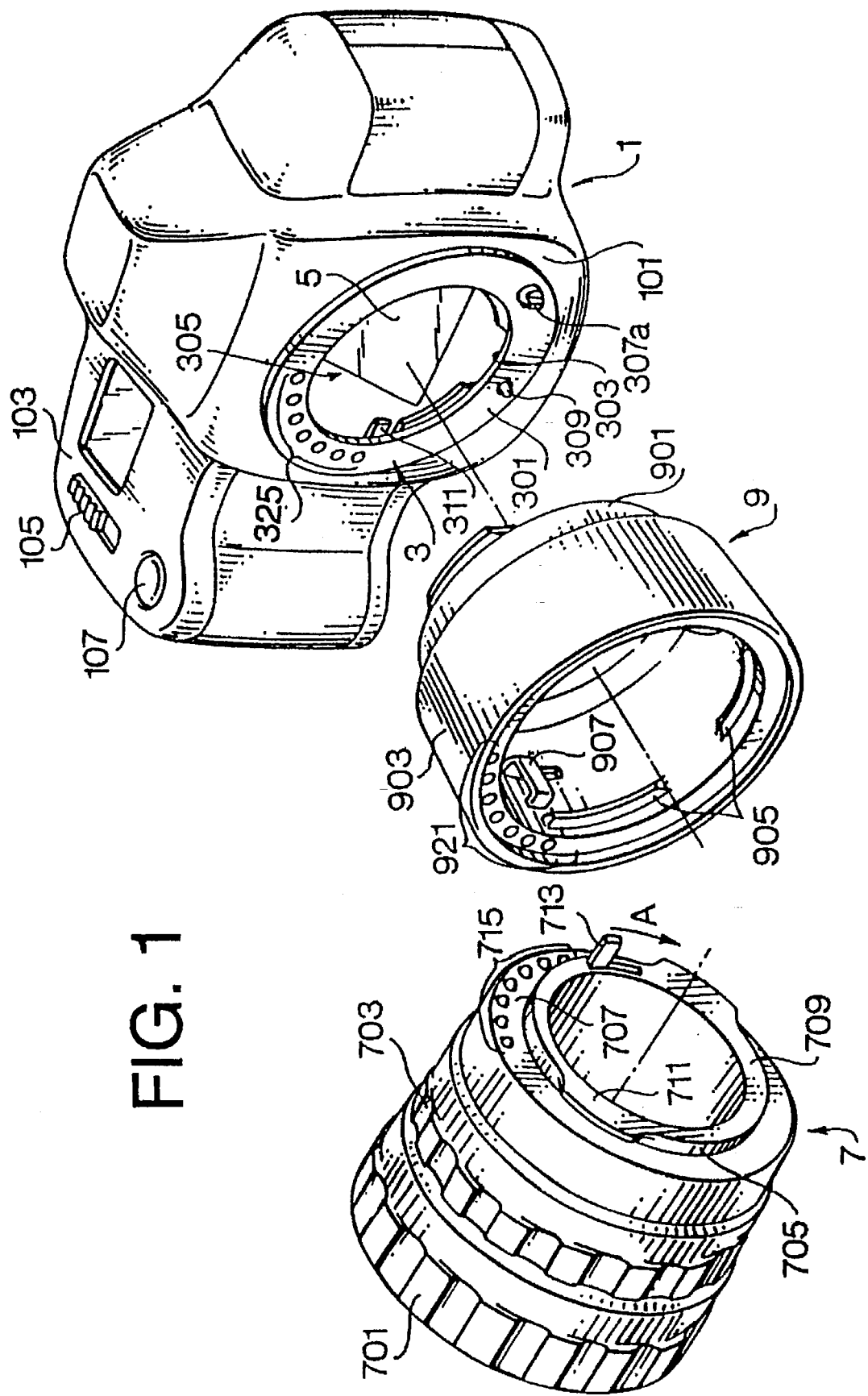
FIG. 1 shows a perspective view of a camera system which has an embodiment of an aperture control system, according to the present invention.

FIG. 1 shows a camera system having an aperture control system according to an embodiment of the present invention. In this embodiment, a lens unit 7 designed to be mounted on a camera having an exposure frame size of 4.5 cm by 6 cm, is attached to a lens adapter 9 and mounted on a standard 35 mm SLR camera body 1.

The camera body 1 has a front surface 101 and a top surface 103. A main power switch 105 and shutter release button 107 are provided on the top surface 103. A lens mount 3 is disposed on the front surface 101. The lens mount 3 has a ring shaped front surface 301 and an inside surface 303, as shown in FIG. 1. An opening 305 is formed inside the ring of the lens mount 3. A quick-return mirror 5 is located between the opening 305 and a shutter mechanism (not shown) of the camera body 1. A lens aperture control mechanism 311 is located between the opening 305 and the quick-return mirror 5. A spring lever 311 of the lens aperture control mechanism is biased such that when a lens normally used with the camera body 1 is attached to the camera body 1, an aperture size of the lens is made a maximum size.

An AF coupler protrusion 307a of an AF coupler 307, used to drive an autofocus (AF) lens, protrudes through an opening in the front surface 301 of the lens mount 3. A lens adapter detecting switch 309 also protrudes through the front surface 310 of the lens mount 3, and is used to detect the presence of the lens adapter 9, when the lens adapter 9 is mounted on the lens mount 3. Camera contacts 325 also protrude through the front surface and provide electrical contact between the camera body and an attached lens or the lens adapter 9.

The lens unit 7 includes a focusing lens group, aperture diaphragms and an aperture size adjustment mechanism (all not shown), controlled by a lens aperture control lever 713. The lens unit further includes a focus ring 701, an aperture ring 703, and a lens mounting member 705. The focus ring 701 is used to manually move the focusing lens group in order to form an in-focus image on the film plane. The aperture ring 703 is used to manually set a size of the aperture of the lens when a frame of a film is exposed.

The lens mounting member 705 includes a ring shaped outer wall 707, and a ring shaped front surface 709. Flanges 711 are formed on the outer wall 707, and are used for securely mounting the lens unit 7 to the adapter 9. The aperture control lever 713 slides in a slot formed along a circumferential direction of the end wall 709. By moving the aperture control lever 713 in the direction of arrow A, the size of the aperture of the lens is made smaller. Lens contacts 715 protrude through the outer wall 707 and enable electrical contact to be made from the camera body 1 to the lens unit 7.

The lens adapter 9 includes a small diameter barrel 901 and a large diameter barrel 903, integrally formed together and arranged concentrically. The small diameter barrel 901 has an outside diameter such that it can be mounted onto the lens mount 3. Further, the large diameter barrel 903 is formed such that its inside diameter will allow the lens mounting member 705 of the lens unit 7 to be mounted thereon. Flanges 905 are formed on an inner surface of the large diameter barrel 903 to receive the flanges 711 of the lens unit 7. The lens adapter 9 also has flanges (not shown) that fit into flanges (not shown) of the camera body 1, to secure the lens adapter 9 to the camera body 1.

Adapter contacts 921 protrude out of an end wall of large diameter barrel 903, and contact lens contacts 715 when the lens unit 7 is attached to the lens adapter 9. Further, a second set of adapter contacts (not shown) which protrude out of an end wall (also not shown) of small diameter barrel 901, are electrically connected to adapter contacts 921. When the lens adapter 9 is connected to the camera body 1, electrical contact is established between the camera body 1 and the second set of contacts on the adapter. Therefore, electrical contact can be maintained between the lens unit 7 and the camera body 1 when the lens unit 7 is mounted using the lens adapter 9.

Figure 2:
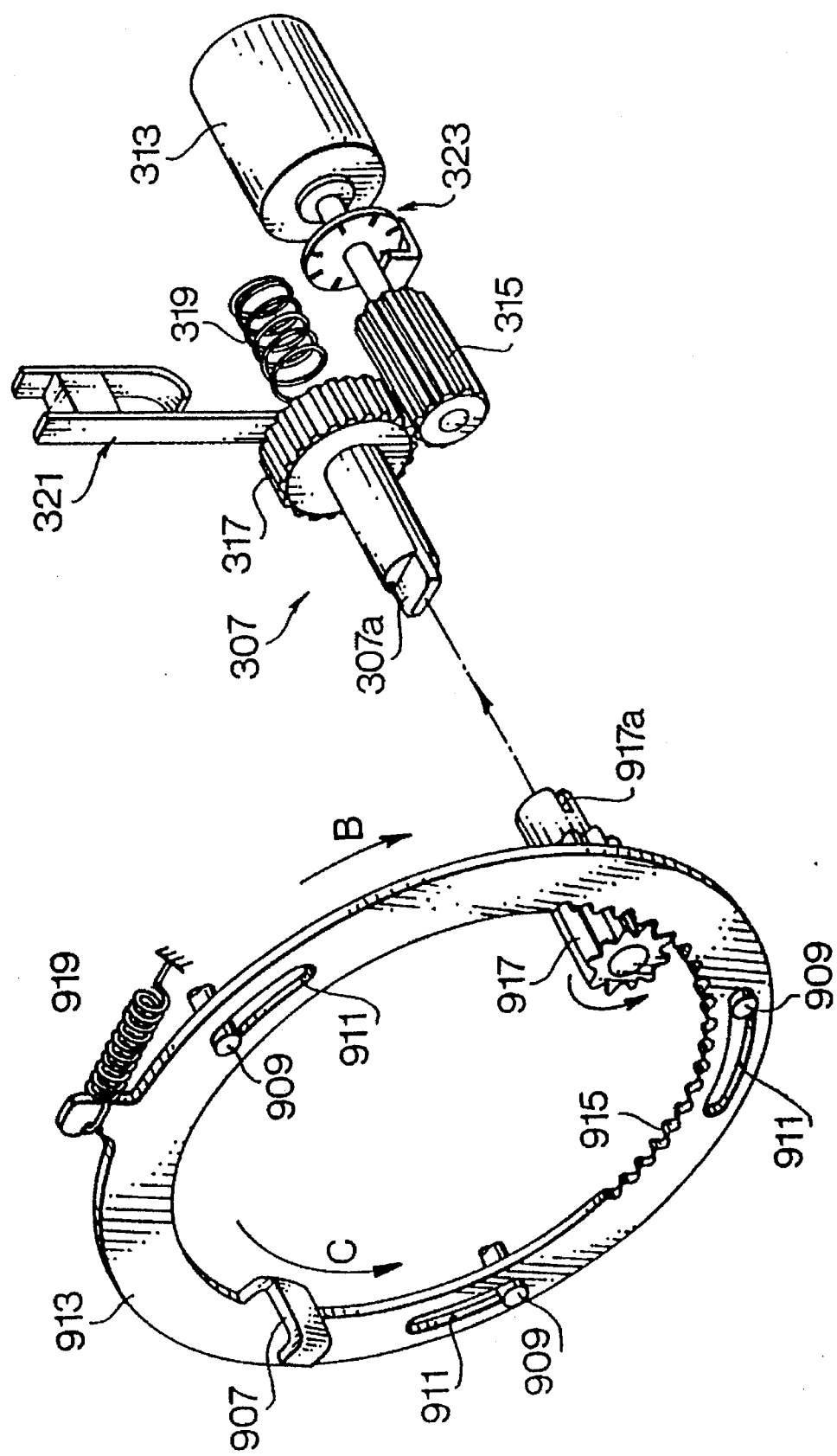
FIG. 2 shows an enlargement of the aperture control system shown in FIG. 1.

FIG. 2 shows an enlarged view of a ring 913 used to mechanically connect the AF coupler 307 and the lens aperture control lever 713. More specifically, when the lens adapter 9 is mounted on the camera body 1, a coupling protrusion 307a of the AF coupler 307 fits into a coupling groove 917a of a pinion gear 917 mounted in the lens adapter 9. Further, pinion gear 917 meshes with an internal gear 915 formed on ring 913. Thus, by rotating the AF coupler 907, the ring 913 can be rotated.

As also shown in FIG. 2, ring 913 includes slots 911 which have pins 909 coupled thereto. The coupling of pins 909 with the slots 911, as well as the length of the slots 911, limits the angle of rotation of the ring 913. An aperture control bar 907 having a substantially U-shape is formed on the ring 913. A spring 919 is attached to a top portion of the ring 913 and applies a spring force which biases the ring 913 in a direction shown by arrow B in FIG. 2.

An exploded view of the AF drive system of the camera body is also shown in FIG. 2. The AF drive system includes AF motor 313, encoder 323, AF drive gear 315, AF coupler 307, and AF coupler switch 321. The AF motor is controlled by a CPU 109 to rotate, thereby rotating the AF coupler 307, through the drive gear 315 and AF coupler gear 317. The encoder 323 is used by CPU 109 to detect the amount of rotation of the AF motor 313.

The AF coupler 307 consists of AF coupler gear 317, AF coupler spring 319 and AF coupler protrusion 307a. The AF coupler spring 319 is a compression spring which biases the AF coupler 307 out of the camera body 1 such that AF coupler protrusion 307a makes reliable contact with groove 917a of the lens adapter unit 9. AF coupler switch 321 is toggled ON or OFF depending on the displacement of the AF coupler 307 relative to the camera body 1. When the AF coupler 307 is properly coupled to drive gear 917, the AF coupler switch 321 is OFF, indicating that reliable coupling has occurred.

Figure 3:
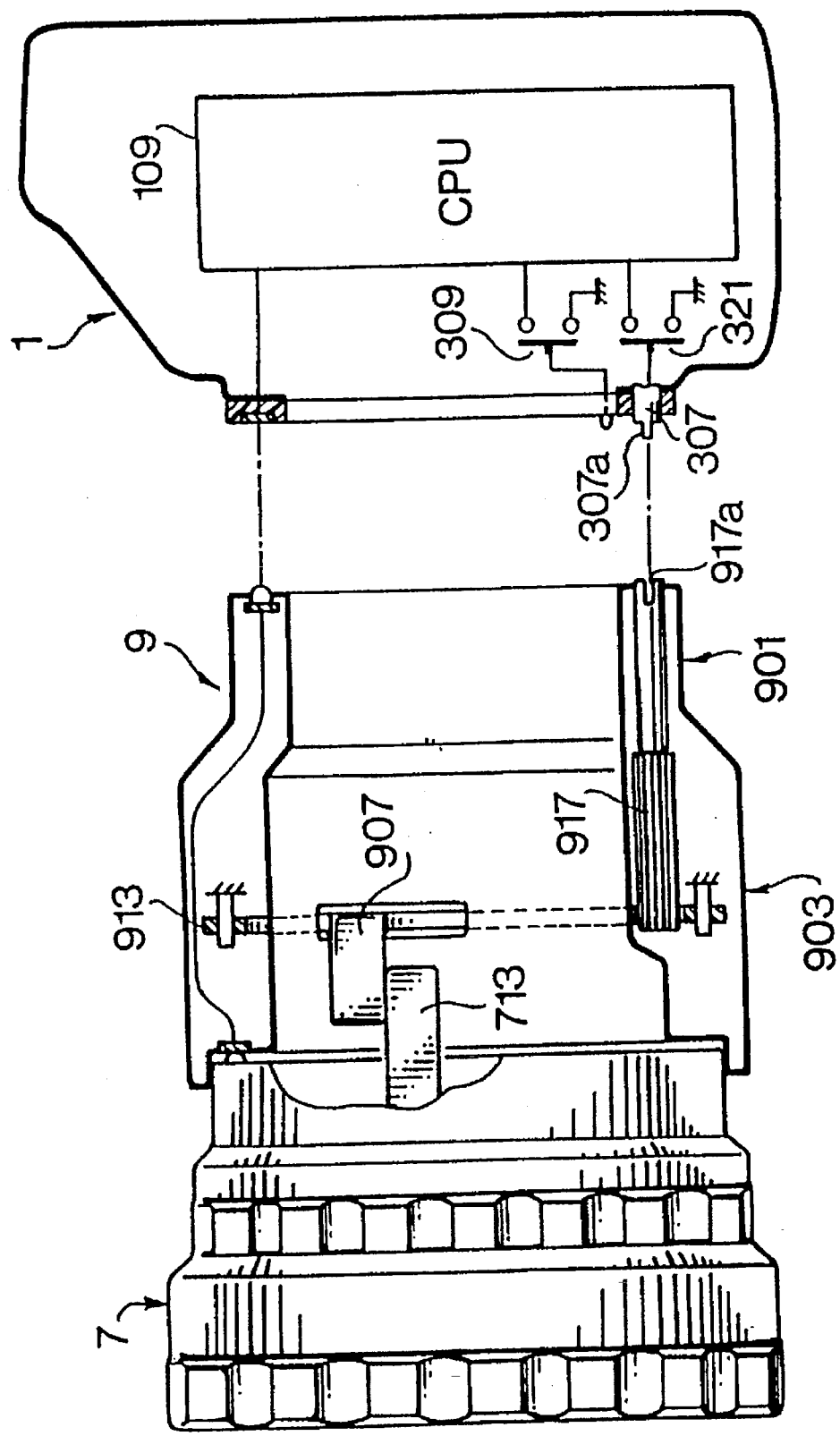
FIG. 3 shows a side view of the camera system shown in FIG. 1.

FIG. 3 shows a schematic side view of the camera 1, lens adapter 9, and lens unit 7. When the lens unit 7 is secured to the lens adapter 9, a lower surface of the aperture control bar 907 contacts an upper surface of the aperture control lever 713. Therefore, as shown in FIGS. 2 and 3, when the lens unit 7 is attached to the camera body 1 using lens adapter 7, rotation of the AF motor 313, rotates the AF coupler 307, and the pinion 917. The pinion 917 is meshed with the internal gear 915 of the ring 913, thereby rotating the ring 913, and thus moving the aperture control bar 907. This moves the aperture control lever 713, to adjust the size of the aperture of the lens.

Figure 4:
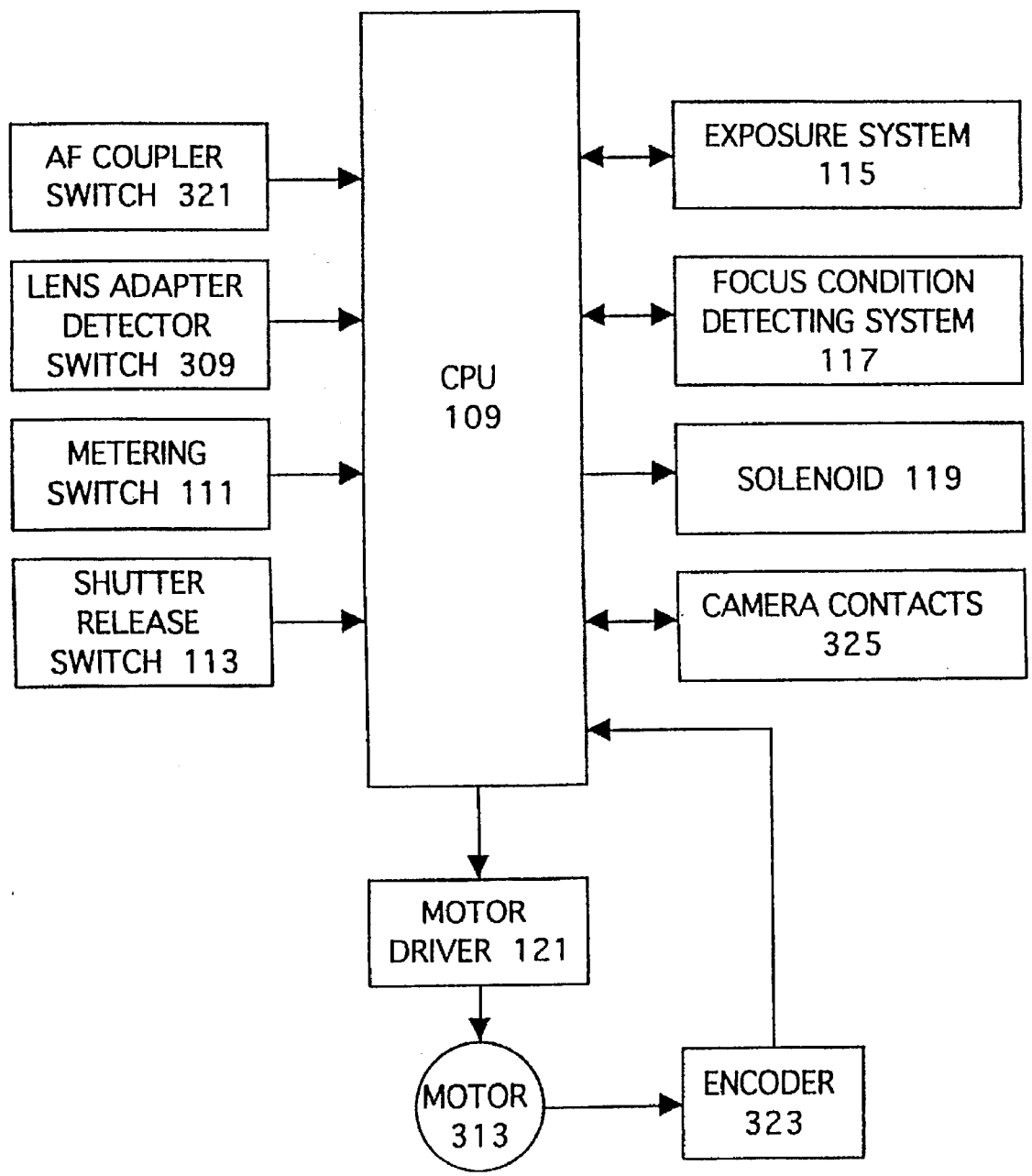
FIG. 4 shows a schematic block diagram of the aperture control system shown in FIG. 1.

FIG. 4 shows the schematic block diagram of the aperture control system. When the lens adapter 9 is mounted on the camera body 1, switch 309 is depressed and closed. The position of the switch 309 (i.e., opened or closed) is detected by the CPU 109 located inside the camera body 1. Further, when AF coupler 307 is properly coupled to pinion 917, AF coupler switch 321 is open. Thus, by detecting the position of AF coupler switch 321, the CPU 109 can determine if the lens adapter 9 is properly coupled to the camera.

When the shutter release button 107 is depressed halfway, a metering switch 111 is turned ON. The CPU 109 then receives metering information from the exposure system 115, and information related to the distance of the object from the focus condition detecting system 117. The focus condition detecting system 117 detects the defocus amount of an object image that is to be photographed. From this defocus amount, the distance of the object from the camera body 1 can be determined. The CPU 109 also receives information, through camera contacts 325, from the lens unit 7 about a maximum and minimum aperture size of the lens unit 7.

When the shutter button 107 is fully depressed, the shutter release switch 113 is turned ON. This is detected by the CPU 109, which then controls the motor driver 121 to drive the AF motor 313, thereby rotating the AF coupler and controlling the position of the aperture control lever 713, and therefore the size of the aperture of the lens unit 7. The CPU 109 also controls the solenoid 119 to move the quick-return mirror 5 and operate a shutter mechanism (not shown) in order to expose the film.

Figure 5A:
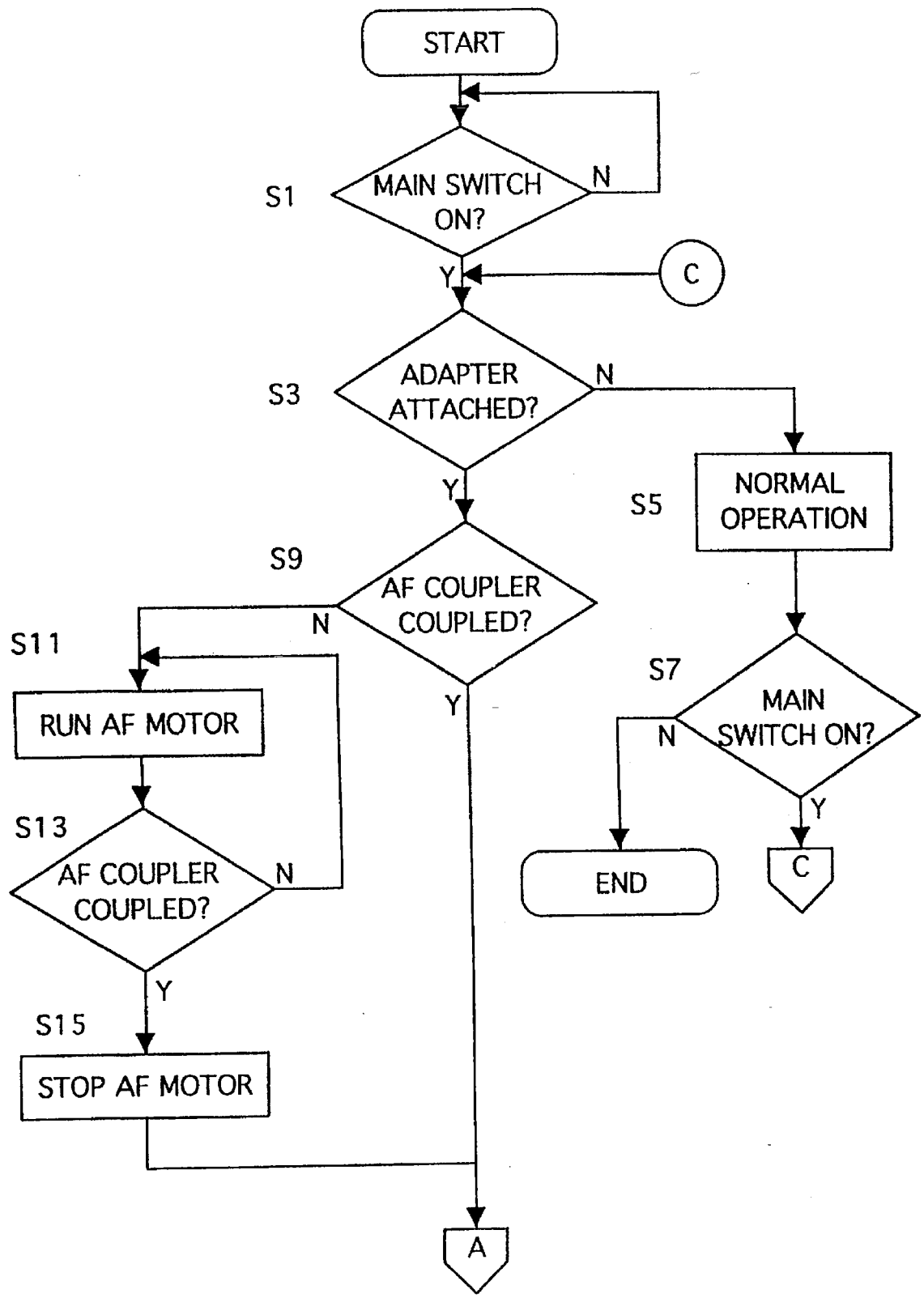
FIGS. 5A, 5B and 5C show a flowchart of an operation of a central processing unit (CPU) shown in FIG. 3.
Figure 5B:
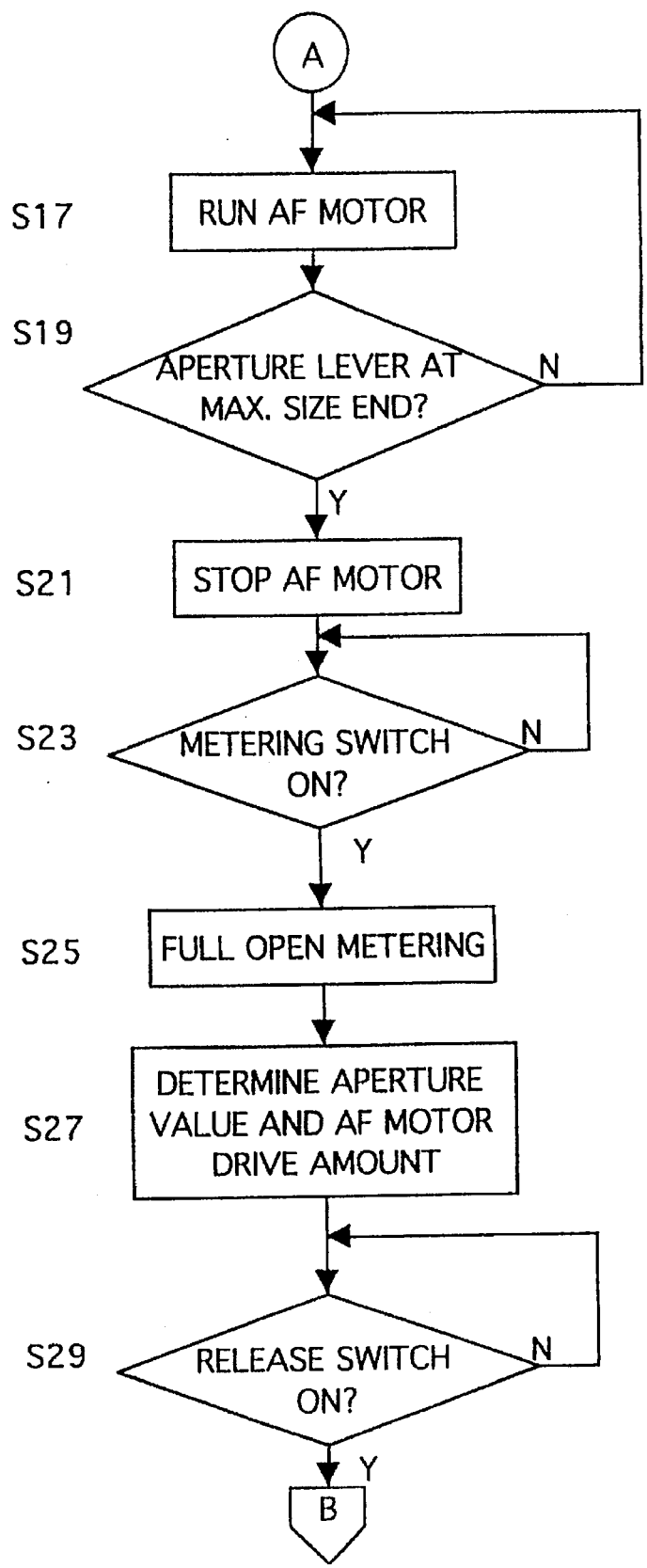
Figure 5C:
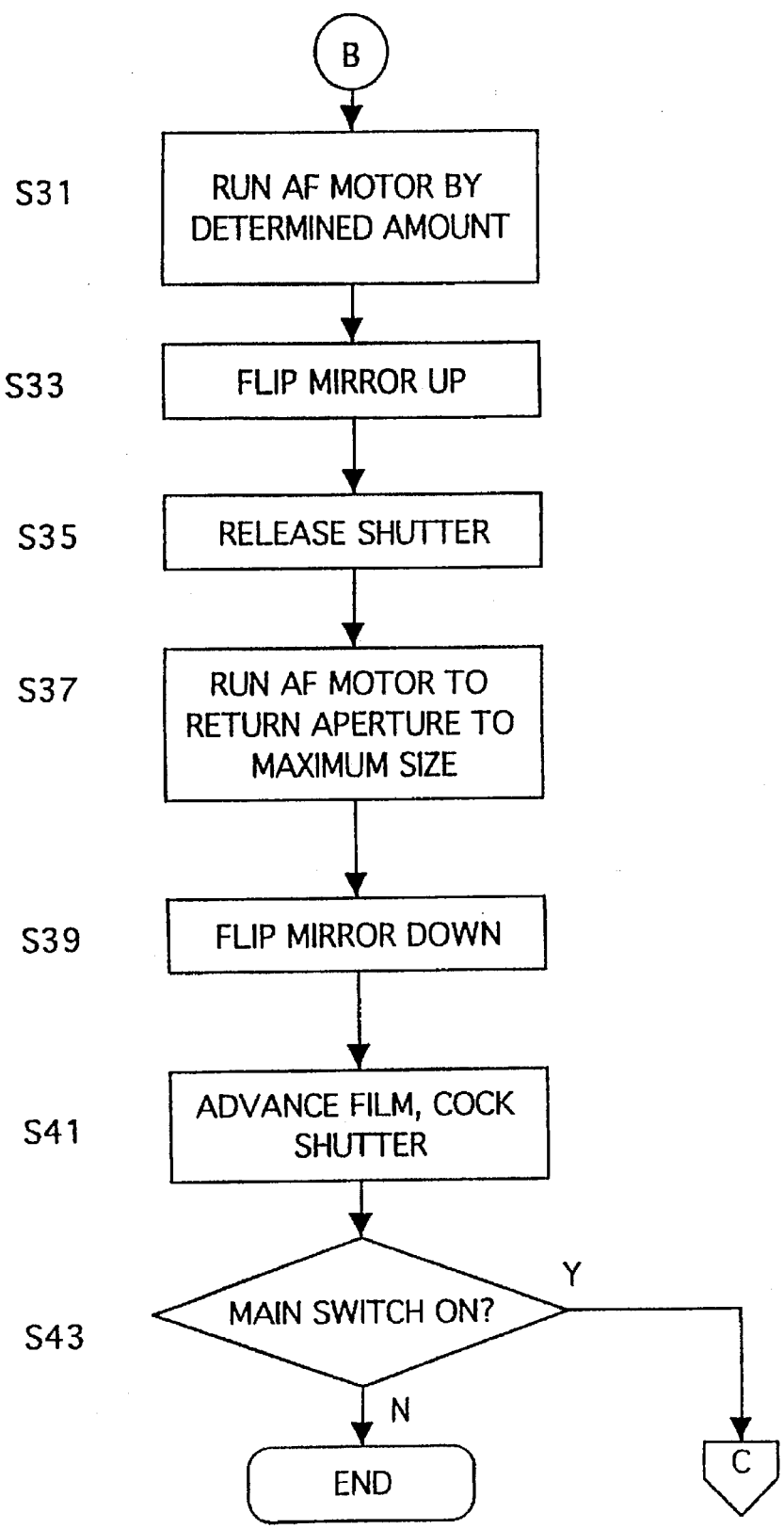

The operation of the aperture control system will be described with reference to the flowchart shown in FIGS. 5A, 5B and 5C.

At step S1, the CPU 109 determines whether the main switch 105 is turned ON. If the main switch is ON, the CPU 109 determines whether the adapter unit 9 is attached to the camera, by detecting the position of the lens adapter detecting switch 309. If the adapter is not connected (S3:NO) then control proceeds to step S5 where normal operation of the camera is continued, and step S7 where the status of the main switch 105 is detected. In this case, if a normal autofocus lens designed to be used with the camera is mounted, then the CPU 109 controls the motor driver 121 to drive the motor 313 according to an autofocus operation mode. If the main switch 105 is turned OFF in step S7, the routine ends, otherwise control goes to step S3.

If the adapter is connected in step S3, the CPU 109 determines whether the AF coupler 307 and the pinion 917 are properly coupled, in step S9, by checking whether AF coupler switch 321 is ON or OFF. If the pinion 917 is not properly coupled to the AF coupler 307 (S9:NO), then the AF motor is operated to rotate the AF coupler 307, thereby changing the orientation of the AF coupler protrusion 307a. The AF motor is driven until the CPU 109 determines in step S13 that the AF coupler 307 has been rotated such that the AF coupler protrusion 307a fits into the pinion groove 917a. Then, the AF motor is stopped in step S15.

As mentioned above, the AF coupler 307 is biased towards the lens adapter unit 9 by the spring 319. Therefore, when the AF coupler protrusion 307a is aligned with the pinion groove 917a, a secure coupling can be achieved due to the spring force.

If the CPU 109 detects that the coupling has been achieved in step S9, control goes to step S17. In steps S17 and S19, the CPU 109 controls the motor driver 121 to drive the AF motor to rotate ring 913 in a direction of arrow B. This is done since the size of the aperture of the lens unit 7 may not be a maximum size after the AF motor 313 was energized to achieve proper coupling in step S11. Thus, the aperture control lever 713 will be moved to a position such that the aperture of the lens unit 7 is a maximum size. Then, the AF motor is stopped in step S21.

At step S23, the CPU 109 detects whether the metering switch 111 is ON. When the release button 107 has been depressed halfway, the metering switch 111 is ON and metering of the object to be photographed occurs at step S25.

Then, based on the metering result, the aperture value of the lens unit 7 is determined and the corresponding amount to drive the AF motor is calculated in step S27.

The maximum and minimum size of the aperture of the lens unit 7 is determined by checking the voltages at a port of the CPU 109 when voltage is applied to the lens contacts 715 through the adapter contacts 921 and camera contacts 325. Some of the lens contacts are floating while others are grounded. This represents binary data corresponding to the maximum and minimum aperture size of the lens. Thus, the CPU 109 can determine the drive amount of the AF motor based on the electrical configuration of the lens contacts 715.

The CPU 109 then detects whether the release switch 113 is ON in step S29. When the release button 107 has been fully depressed, the release switch 113 is ON. In step S31, the CPU 109 controls the motor driver 121 to drive the AF motor 313 by the calculated amount. Then, in step S33, the CPU 109 energizes the solenoid 119 which flips the quick-return mirror 5 up. The shutter is then released in step S35 to allow exposure of the film.

In step S37, the CPU 109 controls the motor driver 121 to drive the AF motor 313 in the reverse direction and back to the maximum aperture size. This reverses the direction of movement of the pinion 917 and also the direction of movement of the ring 913.

Then in step S39, the CPU 109 de-energizes the solenoid 119, and the quick-return mirror 5 flips down to its resting position, as shown in FIG. 1.

The film is advanced 1 frame and the shutter is cocked in step S41. Then, at step S43, the CPU determines whether the main switch is ON. If the main switch is still ON, control goes to step S3, otherwise the routine is ended.

Therefore, as described above, the aperture control system of the present invention utilizes the AF motor drive system to control the aperture of a lens unit 7 attached to the camera using the lens unit adapter 9. With this system, a lens having an aperture control mechanism biased oppositely to that of a lens normally used with a camera body, can be attached to the camera body using the adapter. Further, a lens unit having a different size mounting than is used with the camera body can be attached to the camera body using the lens adapter. Further, by using the AF drive system to drive the ring 913 which then moves the lens aperture control lever 713, a proper autoexposure operation of the camera body and lens can be achieved.

The embodiment described above illustrates the use of a lens unit normally attached to medium format camera (frame size 4.5 cm by 6 cm), mounted on a standard 35 mm camera body. However, by modifying the diameter of the lens barrel 903, any lens having a different mounting size, such as a lens used with a 6 cm by 7 cm format camera or large format camera can be used. Further, a standard 35 mm lens having a lens aperture control mechanism which is designed with the lens aperture control lever oppositely biased to the biasing of a lens aperture control lever of a conventional lens, may be attached to the camera body using the lens adapter unit.

The present disclosure relates to subject matter contained in Japanese Patent Application No. HEI 5-302418 filed on Nov. 8, 1993, which is expressly incorporated herein by reference in its entirety.

What is claimed is:

1. A system for controlling an aperture of a lens including an adapter for mounting said lens onto a camera body, said camera body including an AF motor and an AF coupler drivingly coupled to said AF motor, said lens including an adjustable aperture, a size of said adjustable aperture being controllable by an aperture control lever of said lens, said adapter comprising:

a ring having an internal gear, an aperture control bar formed on said ring; and a pinion gear which meshes with said internal gear, said aperture control bar contacting said aperture control lever of said lens, said AF coupler of said camera body comprising means for driving said pinion gear to rotate said ring, rotation of said ring rotating said aperture control bar, rotation of said aperture control bar moving said aperture control lever of said lens, and changing an aperture size of said lens in association with movement of said aperture control bar.

2. The system for controlling an aperture of a lens according to claim 1, wherein said adapter further comprises:

a lens mounting mechanism; and a camera attaching mechanism, wherein a diameter of said lens mounting mechanism is different from a diameter of said camera attaching mechanism.

3. The system for controlling an aperture of a lens according to claim 1, said camera body including a controller operatively coupled to said AF motor and controlling said AF motor, said camera body further including an exposure system providing metering information, said controller of said camera body coupled to said exposure system and receiving metering information from said exposure system of said camera body, said controller controlling said AF coupler to drive said pinion gear by an amount determined in accordance with said metering information received from said exposure system.

4. The system for controlling an aperture of a lens according to claim 3, said AF coupler comprising an AF coupler switch, said controller comprising means for determining whether said pinion gear is properly coupled to said AF coupler, by monitoring an output of said AF coupler switch.

5. The system for controlling an aperture of a lens according to claim 4, said adjustable aperture of said lens being adjustable within a range between a minimum size and a maximum size, and in response to said determining means of said controller determining that said pinion gear is properly coupled to said AF coupler, said controller drives said AF coupler such that a size of said adjustable aperture of said lens mounted to said camera body is set to said maximum size.

6. The system for controlling an aperture of a lens according to claim 5, wherein said lens is provided with lens contacts, data corresponding to said maximum aperture size and to said minimum aperture size of said lens is related to an electrical configuration of said lens contacts, said adapter further comprises adapter contacts, and said camera body is provided with camera contacts, wherein said adapter contacts and said camera contacts comprise means for electrically connecting said controller of said camera body to said lens contacts, said controller driving said AF coupler in accordance with said data corresponding to said maximum aperture size and to said minimum aperture size.

7. A system for controlling an aperture of a lens, said system comprising a camera body, a lens adapter and said lens, said lens being mounted to said lens adapter, said lens adapter being mounted to said camera body, said lens comprising:

a lens aperture control mechanism, for varying a size of an aperture of said lens, said lens aperture control mechanism comprising an aperture control lever, said lens adapter comprising:

a lens mounting mechanism for mounting said lens to said lens adapter;

a camera body attaching mechanism for mounting said lens adapter to said camera body;

a ring having an internal gear, an aperture control bar formed on said ring, said aperture control bar contacting said aperture control lever of said lens; and a pinion gear meshing with said internal gear, said camera body comprising:

a motor-driven coupler, said motor driven coupler coupled to said pinion gear of said lens adapter; and a controller for controlling said motor-driven coupler during an exposure operation, said controller comprising means for controlling said motor driven coupler to be driven by a predetermined amount, thereby rotating said pinion gear and rotating said ring, rotation of said ring causing said aperture control bar of said lens adapter to move, thereby moving said aperture control lever of said lens.

8. The system according to claim 7, wherein a diameter of said lens mounting mechanism of said lens adapter is different from a diameter of said camera attaching mechanism of said lens adapter.

9. The system according to claim 7, wherein said camera body further comprises:

an adapter detecting switch; and a coupler detecting switch, said controller comprising means for determining that said lens adapter is properly coupled to said camera body when said adapter detecting switch is ON and said coupler detecting switch is OFF.

10. The system for controlling an aperture of a lens according to claim 9, said aperture of said lens being adjustable within a range between a minimum size and a maximum size, wherein when said determining means determines that said pinion gear is properly coupled to said motor driven coupler, said controller drives said motor driven coupler such that a size of said aperture of said lens is set to a maximum size.

11. The system for controlling an aperture of a lens according to claim 10, wherein said lens is provided with lens contacts, data corresponding to a maximum aperture size and to a minimum aperture size of said lens related to an electrical configuration of said lens contacts, said adapter further comprising adapter contacts, and said camera body is provided with camera contacts, said adapter contacts and said camera contacts comprising means for electrically connecting said controller of said camera body to said lens contacts, said controller driving said motor driven coupler in accordance with said data corresponding to said maximum aperture size and to said minimum aperture size.

12. The system according to claim 7 wherein said camera body further comprises:

a system for determining an exposure of an object to be photographed, and said controller determining a drive amount of said motor-driven coupler in accordance with said exposure determined by said determining system.

13. A system for controlling an aperture of a lens, said system including an adapter mounting said lens onto a camera body, said lens comprising an aperture size control mechanism and an autofocus mechanism, said camera body comprising means for driving said autofocus mechanism of said lens, said adapter comprising:

means for detachably mounting said adapter to said camera body and means for detachably mounting at least said lens to said adapter;

a coupling mechanism coupled to and driven by a motive force of said autofocus mechanism drive means, said coupling mechanism further engaging and driving said aperture size control mechanism in response to said motive force of said autofocus mechanism drive means.

14. The system for controlling an aperture of a lens according to claim 13 wherein said coupling mechanism further comprises:

a ring-shaped member having an internal gear, an aperture control bar formed on said ring shaped member; and a pinion gear meshing with said internal gear, said autofocus mechanism driving means of said camera body being coupled with said pinion gear, and said aperture size control mechanism of said lens contacting said aperture control bar.

15. The system for controlling an aperture of a lens according to claim 13, wherein said camera body further comprises:

metering means for providing metering information regarding an exposure; and control means coupled to said metering means for receiving metering information from said metering means and controlling said autofocus mechanism drive means to be driven by an amount determined in accordance with said metering information.

\* \* \* \* \*